United States Patent
Underkofler et al.

(10) Patent No.: US 10,233,639 B2
(45) Date of Patent: Mar. 19, 2019

(54) OPEN PLENUM UTILITY CHANNEL

(71) Applicant: USG Interiors, LLC, Chicago, IL (US)

(72) Inventors: Abraham M. Underkofler, Salem, WI (US); Peder J. Gulbrandsen, Aurora, IL (US); Mark R. Paulsen, Waukegan, IL (US)

(73) Assignee: USG INTERIORS, LLC, Chicago, IL (US)

( * ) Notice: Subject to any disclaimer, the term of this patent is extended or adjusted under 35 U.S.C. 154(b) by 0 days.

(21) Appl. No.: 15/447,147

(22) Filed: Mar. 2, 2017

(65) Prior Publication Data
US 2018/0252356 A1     Sep. 6, 2018

(51) Int. Cl.
| E04B 9/12 | (2006.01) |
| E04B 9/06 | (2006.01) |
| F16L 3/26 | (2006.01) |
| F16M 13/02 | (2006.01) |

(52) U.S. Cl.
CPC .............. *E04B 9/127* (2013.01); *E04B 9/065* (2013.01); *F16L 3/26* (2013.01); *F16M 13/02* (2013.01)

(58) Field of Classification Search
CPC . F16M 13/02; F16L 3/26; E04B 9/064; E04B 9/065; E04B 9/12; E04B 9/127; E04B 9/14; H02G 3/263
USPC ...... 248/317, 342, 343, 49, 58, 61, 65, 68.1, 248/73; 52/220.6, 220.7, 506.06, 506.08, 52/665; 174/68.1, 481, 491
See application file for complete search history.

(56) References Cited

U.S. PATENT DOCUMENTS

| 2,205,700 | A | * | 6/1940 | Smith | ................. E04F 13/0848 |
| | | | | | 52/288.1 |
| 2,920,357 | A | * | 1/1960 | Ericson | ..................... E04B 9/02 |
| | | | | | 454/185 |
| 2,963,751 | A | * | 12/1960 | Mancini | .................. E04B 9/064 |
| | | | | | 52/506.09 |
| 3,310,922 | A | * | 3/1967 | Hoffmann, Jr. | ........... E04B 9/10 |
| | | | | | 403/346 |

(Continued)

FOREIGN PATENT DOCUMENTS

| EP | 0198141 A2 | 10/1986 |
| EP | 0475721 A1 | 3/1992 |

(Continued)

OTHER PUBLICATIONS

International Search Report and the Written Opinion of the International Searching Authority dated May 15, 2018, issued in PCT/US2018/019672, filed Feb. 26, 2018.

*Primary Examiner* — Daniel J Troy
*Assistant Examiner* — Guang H Guan
(74) *Attorney, Agent, or Firm* — Pearne & Gordon LLP

(57) ABSTRACT

A utility channel comprising a plurality of channels and accessory components, the channels having a rectangular cross section with a bottom wall and horizontally spaced parallel sidewalls extending upwardly from lateral edges of the bottom wall, opposed inturned flanges at upper edges of the sidewalls, the flanges having notches open at flange edges distal from a respective sidewall, in alignment with the notches of the opposed flange and uniformly spaced along the length of the channel, the accessory components in the channel interior space engage the flanges to maintain their assembled position in the channel interior space.

4 Claims, 4 Drawing Sheets

(56) References Cited

U.S. PATENT DOCUMENTS

| | | | | |
|---|---|---|---|---|
| 3,596,425 A | * | 8/1971 | Kodaras | E04B 9/008 403/201 |
| 3,785,110 A | * | 1/1974 | Galloway | E04B 9/14 52/715 |
| 3,848,385 A | * | 11/1974 | Thompson | E04B 9/008 403/173 |
| 4,047,348 A | * | 9/1977 | McSweeney | E04B 9/127 403/178 |
| 4,540,847 A | * | 9/1985 | Gardner | E04B 9/064 174/491 |
| 4,598,521 A | * | 7/1986 | Slapsys | E04B 9/127 403/187 |
| 4,658,562 A | * | 4/1987 | Brugman | E04B 9/345 52/665 |
| 4,724,650 A | * | 2/1988 | Carey | E04B 9/14 52/650.3 |
| 6,253,521 B1 | | 7/2001 | Gavin et al. | |
| 6,298,623 B1 | * | 10/2001 | Wendt | E04B 9/006 248/343 |
| 2010/0043330 A1 | * | 2/2010 | Svensson | E04B 9/14 52/506.08 |
| 2018/0252356 A1 | * | 9/2018 | Underkofler | F16M 13/02 |

FOREIGN PATENT DOCUMENTS

| | | | | |
|---|---|---|---|---|
| EP | 0475721 B1 | * | 12/1994 | E04B 9/10 |
| FR | 2657379 B1 | * | 9/1996 | E04B 9/127 |
| GB | 2232694 A | * | 12/1990 | E04B 9/127 |
| GB | 2266736 A | * | 11/1993 | E04B 9/127 |

* cited by examiner

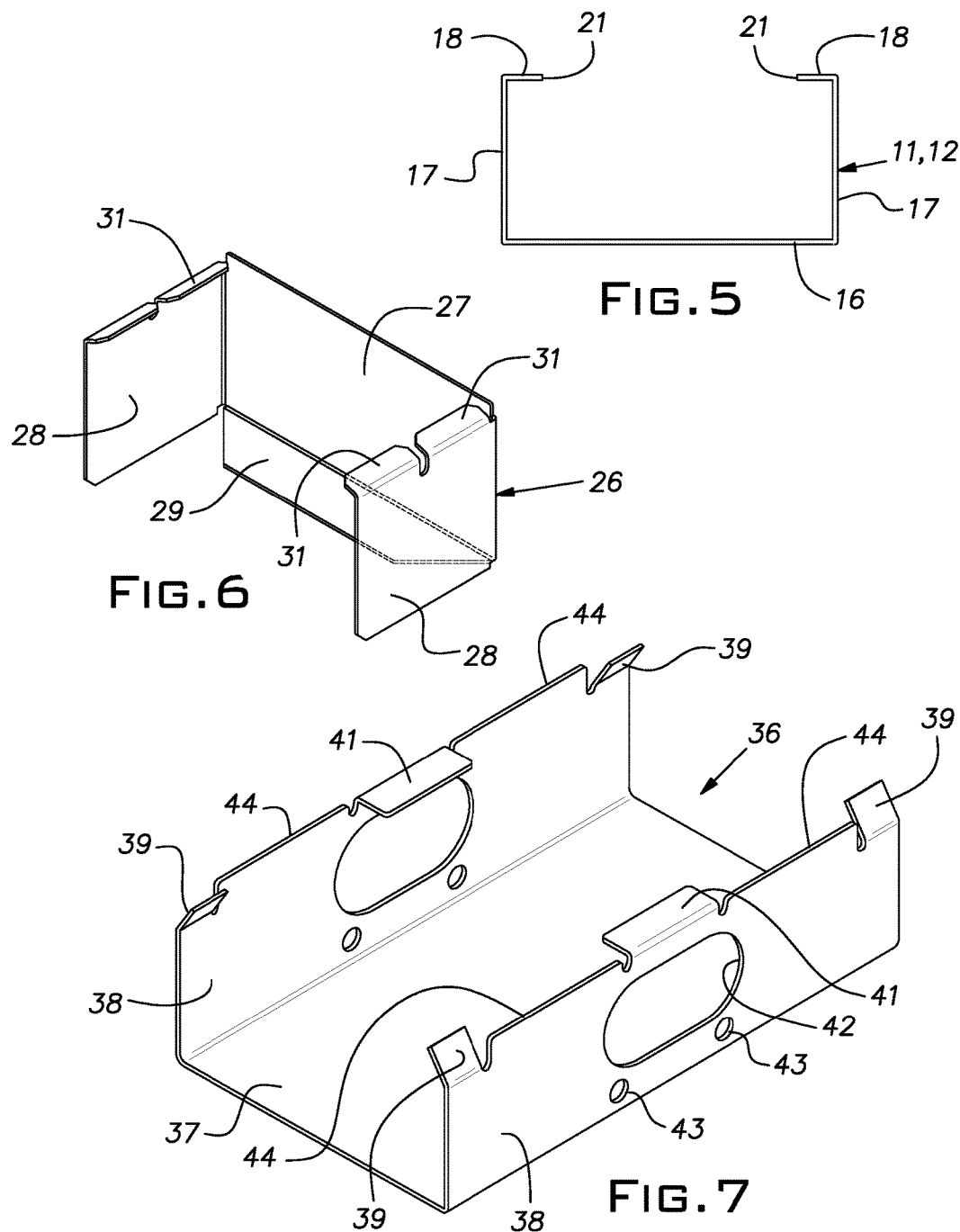

OPEN PLENUM UTILITY CHANNEL

The invention relates to utility channel systems for suspension in spaces without continuous ceilings.

BACKGROUND OF THE INVENTION

So-called open plenum areas in buildings where no continuous ceilings exist, can present a need for support of utility wires and cables where island ceilings or similar structures are desired. Any proposed solution should readily receive wires and cables without undue effort while allowing the wires and cables to be concealed from sight by observers standing below an installation. Additionally, the channels should be easy to erect and assemble into a rectangular grid of desired proportions.

SUMMARY OF THE INVENTION

The invention provides a suspended utility channel system that can be readily installed in an open plenum space and can be configured in rectangular grids of essentially limitless shapes. The system utilizes a channel with closely spaced indexing formations that assure accurate and positive registration with accessory components used to suspend, join, and terminate the channels.

Standard accessory components include splices, end connectors, end clips, and hanger clips all of which are configured to mate with the indexing formations on the channels. A disclosed hanger clip can be snapped into a selected location without the need to slide it lengthwise from a channel end. The hanger clips, additionally, permit wires and cables to be simply laid into the channels so they need not be threaded through or under the hanger clips.

Spaces in a grid formed by the inventive channels can be filled in with lighting, HVAC fixtures, acoustical panels and/or other elements. Grid module size or shape can be determined by the architect or designer of a particular installation effectively without constraints imposed by factory channel lengths.

BRIEF DESCRIPTION OF THE DRAWINGS

FIG. 5 is a cross-sectional view of a typical channel;

FIG. 6 is a perspective view of an end cap;

FIG. 7 is a perspective view of a channel splice member;

DESCRIPTION OF THE PREFERRED EMBODIMENT

Figure 1:
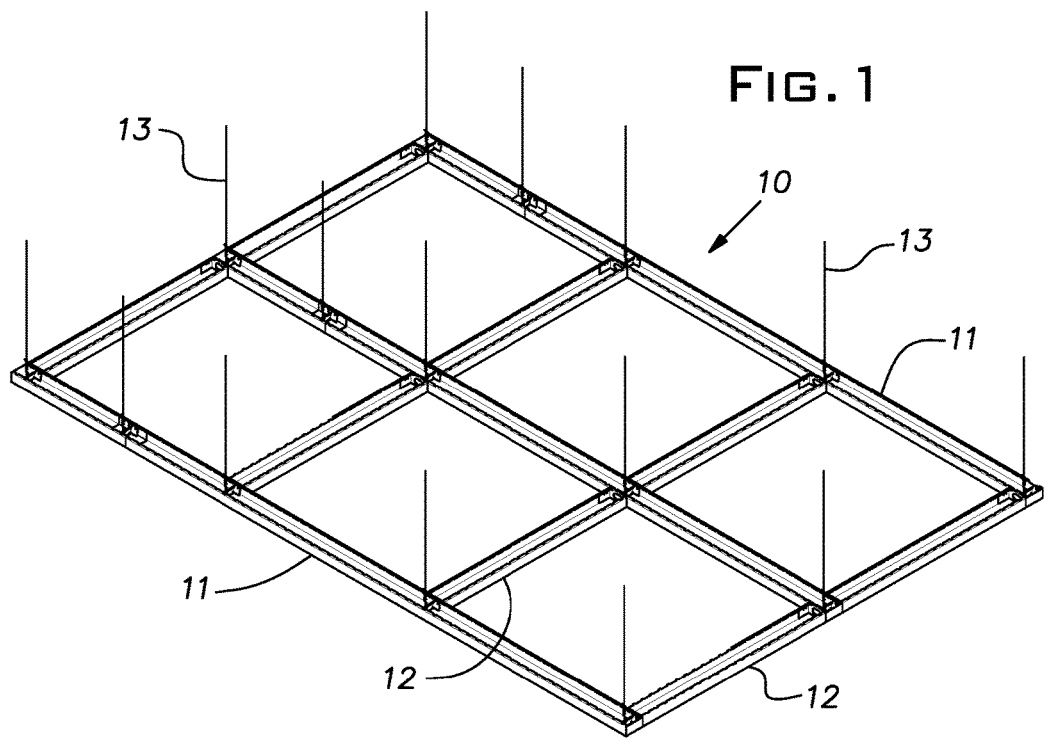
FIG. 1 is a perspective view, looking down, of an exemplary open grid formed of elements of the present invention.

FIG. 1 illustrates an example of a suspended grid 10 assembled from lengths of channels 11, 12 that is used in an open plenum space, i.e. a space without a conventional ceiling. The channels 11, 12 are shown to be carried by overhead structure by conventional suspension wire 13 attached at numerous points on the grid.

The channels can be arranged as main runners 11 typically extending for a distance greater than a grid module and cross runners 12 intersecting the main runners at the borders of the modules in a manner similar to that commonly employed in suspended ceilings. The main and cross channels 11, 12 have the same cross sectional dimensions and shape, illustrated in FIG. 5. By way of example, but not limitation, the channel outside dimensions can measure 4 inches wide and 2 inches high. Preferably, the channels 11, 12 are roll-formed sheet metal of, for example, 22 gauge HDG (hot dipped galvanized) steel or EGS (electrogalvanized steel) resulting in thin wall channels. The main or longer channels 11 can be supplied in 10 foot lengths while the cross channels 12 can be 44 inches long to afford 4 foot center spacing between parallel main channels.

Each channel, 11, 12, has a lower or bottom horizontal wall 16 and integral opposed vertical sidewalls 17, each of which is flat. Upper edges of the sidewalls 17 distal from the bottom wall 16 have associated inturned flanges 18 that serve to stiffen the sidewall. The bottom wall 16, sidewalls 17, and flanges 18 are preferably painted white on their outward faces.

Free edges of the sidewall flanges 18 are formed with notches 19 at a uniform center-to-center distance of, for example, 2 inches. The notches 19 are slightly trapezoidal, being narrower proximal to the respective sidewall 17 than at a distal free edge 21 of the flange 18.

FIG. 6 illustrates an end cap 26 used for finishing or closing a visible, otherwise open end of a channel 11. The end cap 26 is preferably formed as a sheet metal stamping of, for example, 22 gauge HDG or EGS. The end cap elements, as shown, lie in planes of an imaginary rectangular block. The end cap includes a vertical center wall 27. Opposed vertical sidewalls 28, and a horizontal flange 29 each extend perpendicularly from the center wall 27. A pair of tabs 31 on an upper edge of each of the sidewalls 28, extend inwardly towards the opposite sidewall 28. The tabs 31 are slightly inclined upwardly with distance from the sidewall 28 and are proportioned to provide a friction fit with the undersides of the channel flanges 18 when the tabs are received in an end of a channel 11. Typically, at least the outer surfaces of the end cap 26 are painted to match the channels 11, 12. The center wall 27 has a height enabling it to stop against the channel flanges 18.

A channel splice 36, illustrated in FIG. 7, is preferably a single piece sheet metal stamping of, for example, 22 gauge HDG or EGS with a channel configuration that fits closely within the channels 11, 12. The splice 36 includes a bottom wall 37 and opposed sidewalls 38. At upper free edges of the sidewalls 38 are inclined, inturned tabs 39, at opposite ends of the sidewalls, and an inturned horizontal tab 41 at the sidewall mid-length. The middle of each sidewall 38 has an oval opening 42 for passage of wires, cables, or other elements in channels intersecting the channels 11 in which the splice 36 is deployed. Holes 43 can optionally receive fasteners to secure the splice 36 to respective channel ends. The outlying inclined tabs 39 are located on multiples of 2 inch centers and are proportioned to snap in and register with the notches 19 of a pair of butt jointed channels 11, 12. The tabs 39 are configured to spring towards the base of a notch 19 until it contacts the tapered edges of the notch to eliminate any free play. The center tab 41 is configured to slide under the channel flanges 18 of the butted channels and can be optionally secured with self-drilling screws driven downwardly through the channel flanges. Upper edges 44 of the splice sidewalls 38 are proportioned to fit closely between the channel flanges 18 and bottom wall 16 to hold the butt jointed channels flush with one another.

Figure 8:
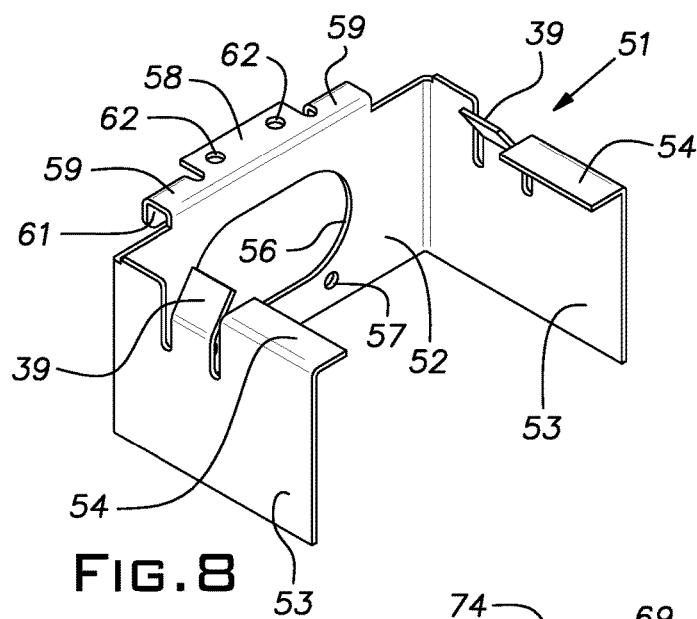
FIG. 8 is a perspective view of a channel end clip.

FIG. 8 illustrates an end clip 51 preferably stamped of sheet metal such as 22 gauge HDG or EGS. The clip 51 is configured to slide with a close fit into the end of a channel 11, 12. In plan view, the clip 51 has a rectangular U-shape. The clip 51 comprises a rectangular end wall 52 and parallel sidewalls 53 all configured to be received in the end of a channel, typically a cross-channel 12. The sidewalls 53 are bilaterally symmetrical. The upper edge of a sidewall 53 has an inturned flange 54 and an inclined inturned indexing tab 39. The tab 39, like previously described tabs, is proportioned to snap or spring into an indexing notch 19 of a channel 11, 12 to positively locate the clip 51 on a channel. Flanges 54, which underlie the channel flanges 18 when installed allow the clip 51 to be redundantly fixed to a channel by driving self-drilling screws through these elements.

The clip end wall 52 has a central utility hole 56 and holes 57 for fasteners. At an upper edge, the end wall 52 has a central horizontal flange 58 and a pair of spaced right angle tabs 59. Depending parts 61 of the tabs 59 are configured to be received in a selected pair of flange notches 19 along the side of an intersected channel 11 to accurately locate the channels relative to one another. FIG. 1 shows that the tab parts 61 allow indexing tabs 39 of other components to be received in the same notches 19. Holes 62 are provided in the flange 58 to receive self-drilling screws or other fasteners to redundantly lock the clip 51 to the flange 18 of the intersected channel 11, 12.

Figure 9:
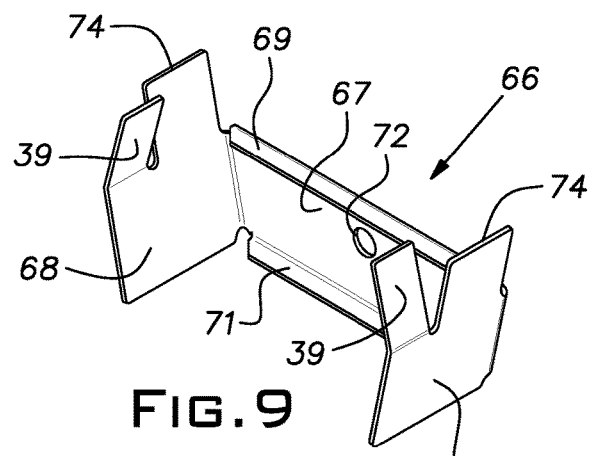
FIG. 9 is a perspective view of a channel hanger clip.
Figure 10:
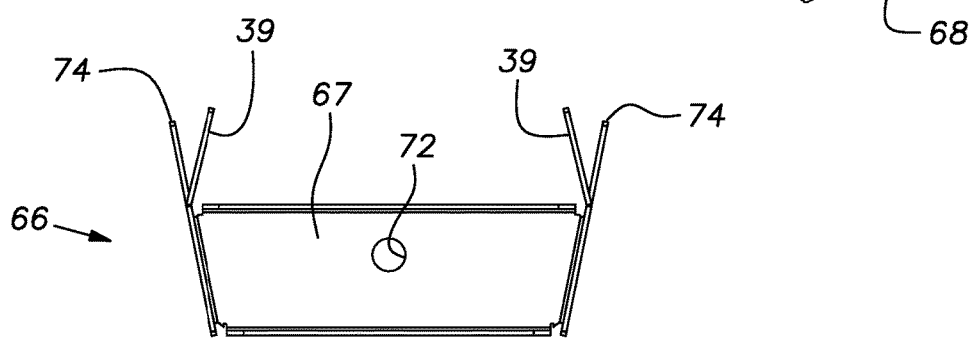
FIG. 10 is an elevational view of the channel hanger clip of FIG. 9.

With reference to FIGS. 9 and 10, a hanger clip 66 is preferably made as a sheet metal stamping of, for example, 18 gauge HDG or EGS. The clip 66 has a central vertical web 67 and bilaterally symmetrical side flanges 68 at opposite ends of the web. The web 67 is stiffened by upper and lower horizontal flanges 69, 71. At its mid-length or horizontal center, the web 67 has a hole 72 to receive a suspension wire 13 (shown in FIG. 1). Main parts of the side flanges 68 lie in planes that diverge from one another with reference to an upward direction and are each perpendicular to a plane of the central web 67. The web 67 and side flanges 68 project a trapezoidal profile in the elevational view of FIG. 10. Indexing tabs 39 integral with the side flanges 68 are proportioned to snap fit into a pair of opposed channel flange notches 19 while upper edges 74 of the side flanges 68 are configured to fit below respective channel flanges 18. The trapezoidal profile of the hanger clip 66 allows the clip to be conveniently installed laterally, i.e. vertically into a channel at a selected position rather than from an end of the channel. This assembly feature is permitted by resilient deflection of the channel sidewalls 17 and clip side flanges 68. The hanger clip 66 by virtue of its geometry and inherent resilience, can be assembled within an installed splice 36, end cap 26 or end clip 51 or can be installed in a channel where no other such accessory exists. When the clip 66 is assembled in a channel 11, 12, and suspended from a wire 13, the clip flanges 68 at their upper edges 74 support the weight associated with the channel 11, 12 in which it is installed. Since the upper edges 74 of the flanges 68 carrying the channel load are relatively close to the plane of the web 67, there is negligible eccentric loading on the clip 66.

Figure 2:
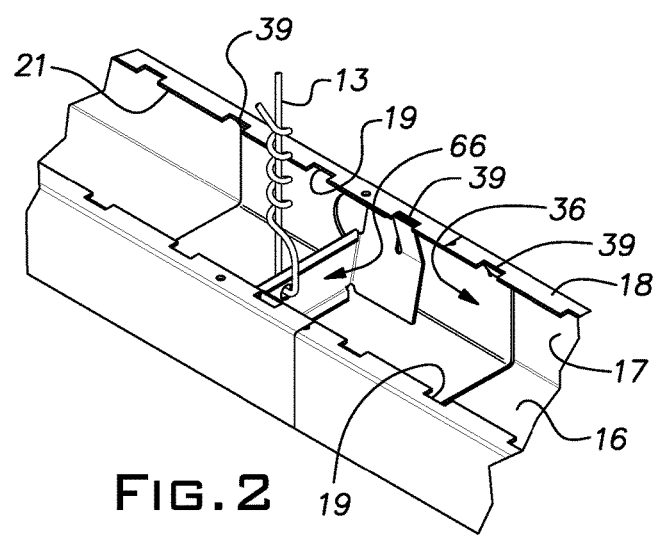
FIG. 2 illustrates a splice joint between ends of the inventive channel.
Figure 3:
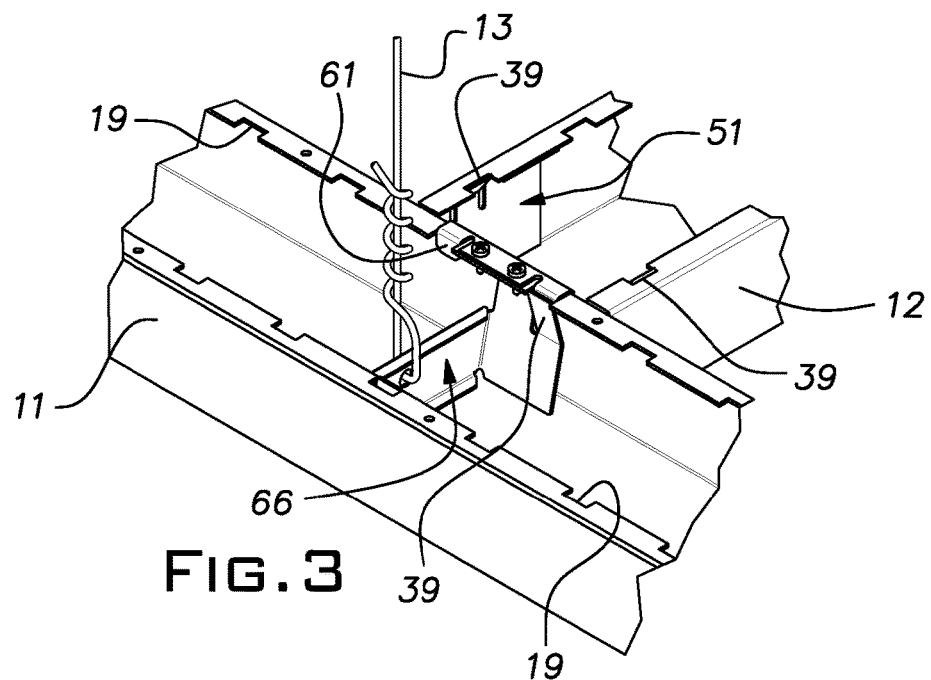
FIG. 3 illustrates an intersection of a cross-channel with a main channel.
Figure 4:
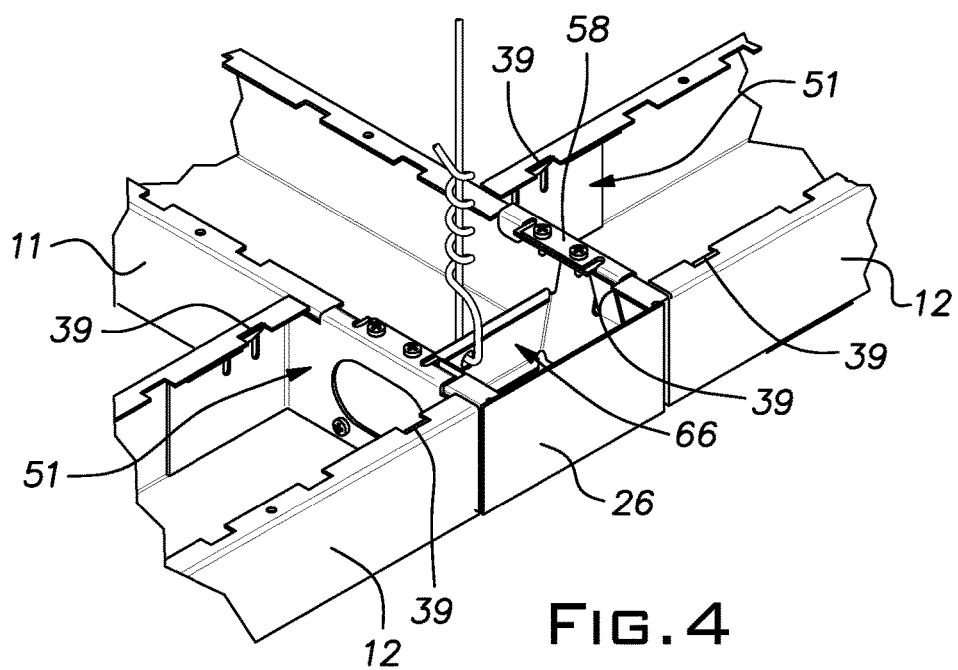
FIG. 4 illustrates the end of a main channel intersected by two cross channels.

In an installed position of the clip 66 shown in FIGS. 2-4, the web 67 including the upper flange 69 is well below the top of a channel so that cables, wires and the like can be set into the channels serving as races without the need to thread them through or under the clip.

The disclosed channel accessory components provide a versatile system that can be fashioned into grids of practically any module size and shape. A 10 foot main runner channel 11 or a shorter channel 12 can be spliced together or cut down in length to fit an existing space or satisfy a new design. The small spacing of the notches 19 permits great freedom in channel length and location of the suspension clips 66. The locking tabs 39 of the accessory components make assembly quick, accurate and positive.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A utility channel system useful for suspension in an open plenum space, the utility channel system comprising:
   a plurality of thin wall channels; and
   a plurality of accessory components;
   wherein the plurality of thin wall channels include a first thin wall channel and a second thin wall channel;
   wherein each of the plurality of thin wall channels includes:
   a closed bottom wall;
   horizontally spaced parallel sidewalls, wherein the closed bottom wall extends continuously between the horizontally spaced parallel sidewalls, wherein the horizontally spaced parallel sidewalls extend upwardly from lateral edges of the closed bottom sidewall, and wherein the closed bottom wall and the horizontally spaced parallel sidewalls define an interior space; and
   opposed inturned flanges at upper edges of the horizontally spaced parallel sidewalls, wherein the opposed inturned flanges include a first inturned flange and a second inturned flange, wherein each of the first and second inturned flanges has a flange edge and notches open at the flange edge, wherein the flange edge of each of the first and second inturned flanges is distal from a respective one of the horizontally spaced parallel sidewalls, wherein the notches of the first inturned flange are aligned with the notches of the second inturned flange, and wherein the notches of each of the first and second inturned flanges are uniformly spaced along a length of the respective thin wall channel;
   wherein each of the plurality of accessory components is configured to fit in the interior space of one of the plurality of thin wall channels and engage the opposed inturned flanges of the one of the plurality of thin wall channels in an assembled state; and
   wherein the plurality of accessory components include:
   a channel splice configured to fit closely within the interior spaces of the first and second thin wall channels in the assembled state, wherein the channel splice has longitudinally spaced tabs proportioned to register and engage a first plurality of notches selected from all the notches of the opposed inturned flanges of the first and second thin wall channels in the assembled state; and
   a hanger clip configured to be received in the channel splice in the assembled state, wherein the hanger clip has tabs proportioned to register and engage a second plurality of notches selected from all the notches of the opposed inturned flanges of the first and second thin wall channels in the assembled state, and wherein the second plurality of notches are arranged longitudinally between the first plurality of notches along the lengths of the first and second thin wall channels in the assembled state.

2. A utility channel system as set forth in claim 1, wherein each of the plurality of accessory components is a sheet metal part, and wherein each of the plurality of accessory components includes tabs indexable with a pair of notches selected from the notches of the opposed inturned flanges of the one of the plurality of thin wall channels in the assembled state.

3. A utility channel system as set forth in claim 2, wherein each of the notches of the opposed inturned flanges of each of the plurality of thin wall channels is tapered so as to become narrower with distance from the respective flange edge such that the tabs of each of the plurality of accessory components are configured to be self-tightening in the notches of the opposed inturned flanges of the one of the plurality of thin wall channels in the assembled state.

4. A utility channel system as set forth in claim 2, wherein the hanger clip is configured to receive a wire or cable at a position below the opposed inturned flanges of one of the first and second thin wall channels in the assembled state.

\* \* \* \* \*